United States Patent Office 3,093,454
Patented June 11, 1963

3,093,454
PRODUCTION OF GRANULATED CALCIUM CYANAMIDE
Thomas Fischer, Trostberg, and Hans Knoblauch, Trostberg-Mogling, Germany, assignors to Suddeutsche Kalkstickstoff-Werke A.G., Trostberg, Germany
No Drawing. Filed Apr. 5, 1961, Ser. No. 100,793
Claims priority, application Germany Apr. 6, 1960
4 Claims. (Cl. 23—78)

The invention relates to the granulation and briqueting of calcium cyanamide.

Several proposals are known to convert powdery calcium cyanamide into a stable form by application of pressure. According to the German Patent No. 231,646, water amounts are used which are far below those required for a complete hydration; such procedure cannot produce permanently stable grains, even though pressure is applied during or immediately after the addition of water. According to German Patent No. 379,836, the calcium cyanamide is almost completely hydrated (though the proposed amount of 7% is not quite sufficient); however, additional 10 to 20 percent of water are added prior to the compression.

Complete hydration as obtained by addition of about 9.5 percent of water, is now considered to be a condition for stable compressed calcium cyanamide; in order to obtain stable compressed grains, considerable amounts of a dilute sugar solution (20 to 35 percent by weight of the treated calcium cyanamide) were added, and the admixture was compressed to thin layers; said layers were disintegrated to grains which were dried after the rolling operation.

It is not questioned at present that complete hydration is necessary prior to compression. However, all known press procedures require additional amounts of water or liquid. As a result, the dicyandiamide content of the calcium cyanamide is increased, and considerable losses of ammonia are sustained which affect the economy of the process. Though dicyandiamide is, theoretically, not a complete loss from the point of view of the fertilizer effect, its nitrogen becomes available, at the earliest, only after 1 year; for this reason, a dicyandiamide content in excess of 1% is undesirable.

Not much need be said about the ammonia losses; any formation of ammonia is considered a loss and jeopardizes the economy of the process.

We have found that compressed calcium cyanamide can be obtained substantially without losses of ammonia and without formation of dicyandiamide, when completely hydrated calcium cyanamide is subjected, without any further addition of liquid, to shaping pressure in the presence of nitrate N and/or urea N. Surprisingly, stable and abrasion-resistant briquets are obtained when pressure is applied to hydrated calcium cyanamide containing nitrate and/or urea but substantially no free water.

In a preferred embodiment of the invention, pressure is applied to the calcium cyanamide leaving the hydrating apparatus when it is still warm and has a temperature below 100° C., preferably of about 70 to 90° C. White calcium cyanamide may also be used as starting material.

The novel procedure offers the following advantages:
(a) The nitrate and/or urea component of a mixed fertilizer is introduced in simple manner into the calcium cyanamide;
(b) The pretreated calcium cyanamide is shaped in the dry state, i.e. in the absence of water; the formation of dicyandiamide is suppressed and there is substantially no loss of ammonia;
(c) The conventional drying step is omitted.

The preceding hydration may be carried out, for instance, by means of a solution of calcium nitrate, magnesium nitrate, urea, urea nitrate, or mixtures thereof in such a way that the reaction mixture has at all times less than 0.5 to 1 percent of free water. A suitable hydrating method and apparatus are described in the German Auslegeschrift, 1,097,457. The concentration of the hydrating solutions is not critical, and any concentration can be used, provided that the total amount of the hydrating solution is sufficient to hydrate completely the free calcium oxide contained in the calcium cyanamide and that the hydrated product contains not more than about 1 percent of free water.

The pressure may be applied in a single or in several steps, if desired, with heated pressure means. The total pressure is between 300 kg. and 1000 kg./cm.$^2$ and is the lower, the higher the nitrate or urea content is. Smooth or grooved compression rolls may be used.

If several pressure steps are employed, the first step, for instance at 100 to 500 kg./cm.$^2$, may serve only for compacting the material, whereby no shaped structures are produced; such structure is then obtained easier and without substantial waste in the second compression step at 300 to 1000 kg./cm.$^2$.

After forming and shaping, the compressed calcium cyanamide structures are disintegrated to the desired grain size. In some cases, it has proven to be of advantage for the stability and strength of the grains to allow a certain time interval between the compressing and disintegrating step. The grains may be eventually rolled; after screening, the dust formed thereby is admixed to fresh hydrated calcium cyanamide to be compressed.

The produced compressed grains, when strewn over the soil, are slowly decomposed by the air and soil moisture and transfer their valuable components to the plants. The compressed calcium cyanamide of the invention presents a new form of dustless calcium cyanamide.

The following examples illustrate the method of the invention.

*Example 1*

10 long tons/hour of calcium cyanamide were mixed with 1.6 long ton/hour of a 40% Ca(NO$_3$)$_2$ solution (960 kg. of water) in a continuous paddle mixer as shown in the German DAS 1,097,457. The residence time was about 1 hour, and the heat of hydration was removed in a suitable manner.

The dry material leaving the mixer, which had a temperature of about 80 to 95° C., was forced between smooth rollers turning in opposite direction under a pressure of 800 kg./cm.$^2$ to platelets of a thickness of about 0.5 to 2 mm., which were then broken up to grains of a size of about 0.3 to 1.5 mm.

*Example 2*

In the same mixer as used in Example 1, and under the same conditions, 10 long t./h. of calcium cyanamide were mixed with 1100 kg./h. of a 50% magnesium nitrate solution and 600 kg./h. of a 40% urea solution.

The mixed hydrated material was compressed in two steps; in the first step, the pressure of the rolls was 250 kg./cm. In the second step, a pressure of 750 kg./cm. was used, and subsequently the compressed material was broken up to grains.

The obtained grains were hard, mechanically stable, and very little subject to abrasion and dust formation while shipped or otherwise handled.

*Example 3*

In the same mixer as used in Example 1, and under the same conditions, 10 long t./h. of calcium cyanamide were mixed with 4000 kg./h. of a 75% Ca(NO$_3$)$_2$ solution.

The dry material leaving the mixer, which had a temperature of about 90° C., was forced between smooth rollers turning in opposite direction under a pressure of 600 kg./cm.$^2$ to platelets of a thickness of about 0.5 to 2 mm., which were then broken up to grains of a size of about 0.3 to 1.5 mm.

*Example 4*

In the same mixer as used in Example 1, and under the same conditions, 10 long t./h. of calcium cyanamide were mixed with 1.2 t. of a 20% urea nitrate solution.

The mixed hydrated material was compressed at 950 kg./cm.$^2$ and then one proceeds as mentioned above.

We claim:

1. A method of producing granulated calcium cyanamide comprising mixing calcium cyanamide with an aqueous solution of a compound selected from the group consisting of calcium nitrate, magnesium nitrate, urea, urea nitrate, and mixtures thereof, in an amount sufficient to hydrate the free calcium oxide contained in the calcium cyanamide and exceeding such sufficient amount by not more than 1 percent, and granulating the thus obtained dry hydrated product under a pressure of about 300 to 1000 kg./cm.$^2$.

2. The method as claimed in claim 1 wherein said pressure is applied to the hydrated product while it is still warm.

3. The method as claimed in claim 1 wherein the pressure is applied in at least two steps.

4. The method as claimed in claim 1 wherein said compounds are used in a concentration of about 20 to 75 percent by weight of said aqueous solution.

References Cited in the file of this patent

UNITED STATES PATENTS

| | | |
|---|---|---|
| 1,326,310 | Thrane | Dec. 30, 1919 |
| 1,908,978 | Hamprecht | May 16, 1933 |
| 2,989,684 | Cox | Feb. 5, 1935 |
| 2,632,687 | Walter | Mar. 24, 1953 |